Oct. 19, 1965   M. SALESSE ETAL   3,212,992
NUCLEAR FUEL ELEMENT CASING
Filed March 17, 1961   6 Sheets-Sheet 1

Oct. 19, 1965 M. SALESSE ETAL 3,212,992
NUCLEAR FUEL ELEMENT CASING
Filed March 17, 1961 6 Sheets-Sheet 3

Oct. 19, 1965  M. SALESSE ETAL  3,212,992

NUCLEAR FUEL ELEMENT CASING

Filed March 17, 1961  6 Sheets-Sheet 4

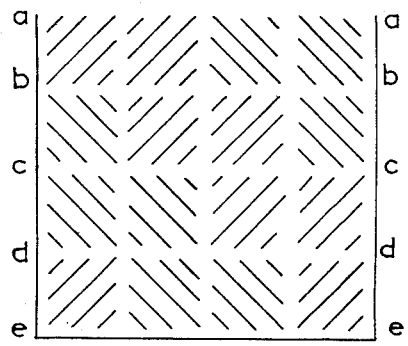
Fig.12
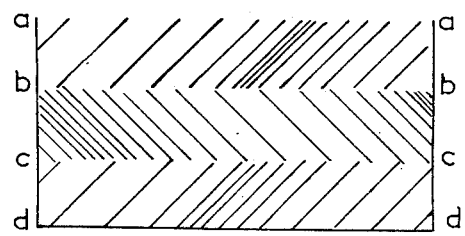
Fig.13
Fig.14
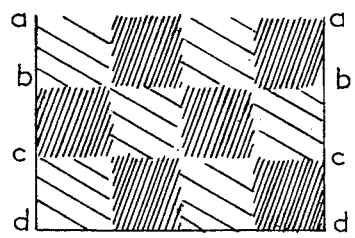

United States Patent Office 3,212,992
Patented Oct. 19, 1965

3,212,992
NUCLEAR FUEL ELEMENT CASING
Marc Salesse, Gif sur Yvette, and Jacques Andre Stohr, Bures sur Yvette, France, assignors to Commissariat a l'Energie Atomique, Paris, France
Filed Mar. 17, 1961, Ser. No. 96,484
Claims priority, application France, Dec. 5, 1958, 780,916; Mar. 17, 1960, 821,588
6 Claims. (Cl. 176—81)

This application is a continuation-in-part of our application Serial No. 857,190, filed December 3, 1959, now abandoned.

Considerations of energy yield necessitate recovering the calories released by the fuel elements of atomic reactors at the highest possible temperature.

It is therefore desirable to have, simultaneously:
(1) a high temperature in the fuel
(2) a slight difference in temperature between the fuel and the cooling fluid.

The temperature prevailing in the fuel should not exceed a certain value depending on the nature of the fuel and should be compatible with a satisfactory behaviour of the casing.

In order to improve the yield, therefore, it is necessary to reduce to a minimum the difference in temperature between the fuel and the cooling fluid or between the casing and the cooling fluid.

Approximately speaking, the heat exchange between the casing and the cooling fluid coming into contact therewith is governed by a law in the following form:

$$\varphi = h . \Delta \theta . S \text{ or } \Delta \theta = \frac{\varphi}{Sh}$$

$\varphi$ being the calorific flux passing through the surface $S$ of the casing, $h$ being the coefficient of heat exchange which depends on the nature of the cooling fluid, its rate of flow and the nature of the casing.

$\Delta \theta$ being the difference between the temperature of the casing and the mean temperature of the cooling fluid circulating in the channel which contains the fuel element to be cooled.

Various known ways enable the difference in temperature $\Delta \theta$ to be reduced:

(1) Longitudinal fins can be formed on the surface of the casing: these increase the heat-exchange surface which is reflected in a reduction in the calorific flux per unit of area $$\frac{\varphi}{s}$$

(2) A turbulence can be produced in the cooling fluid, which has the effect of increasing the coefficient of heat exchange $h$;

(3) The two factors $$\frac{\varphi}{s}$$

and $h$ are both influenced by means of transverse fins or helical fins;

(a) transverse fins: the turbulence and the cooling surface are increased, but the cooling fluid undergoes a great loss of head;

(b) helical fins: the fins determine one or more helices on the surface of the casing; the coefficient of heat exchange is only slightly increased; actually the turbulence is very limited because each little stream of fluid circulating helicoidally is substantially independent of the outer annular main stream bounded by the walls of the channel where the fluid is circulating and the surface passing the edges of the fins; one consequence of this particular system is that, in the case of a plurality of helices, the various streams of fluid are substantially independent of one another.

It has been demonstrated by the inventors herein that it is possible to have a large exchange surface and a high coefficient of heat exchange by using a structure derived from a structure having helical fins.

It is an object of the present invention to provide an improved nuclear fuel element casing which overcomes the disadvantages of the systems comprising longitudinal fins, transverse fins or helical fins.

According to the present invention there is provided a nuclear fuel element casing, comprising a cylindrical body having fins forming around the outer surface of the body sets of portion of helices, the portions in a set being oppositely directed to the portions of the adjacent set. Narrow passages, which may be straight or broken and which have no fins, may be provided between adjacent sets, or the fins in one set may be connected to the fins in adjacent sets to form complete herring-bones round the casing.

According to a first embodiment of the present invention the portions in a set are parallel and the sets extend longitudinally on the body.

According to another embodiment, the series of fins extend transversely with respect to the body of the sheath, each series being made up of fins parallel to one another; in a variant of this embodiment, each series is made up of groups of fins, the inclinations of opposite fins in two consecutive series are oppositely directed, and the inclinations of the fins in two consecutive groups in a given series are oppositely directed.

According to the first form of embodiment, let $A_1$, $B_1$, $A_2$, $B_2$ . . . be the sets of portions of helices found successively round the casing; the helices in the various sets $A_1$, $A_2$ . . . are all in the same direction and are left-handed; the helices $B_1$, $B_2$ . . . are in the opposite direction or right-handed.

Generally, the fins in one set are not connected to those in the adjacent set and a narrow passage is provided between two adjacent sets. Let $C_1$, $C_2$, $C_3$ . . . be the passages devoid of fins left between $A_1$ and $B_1$, $B_1$ and $A_2$, $A_2$ and $B_2$ . . . .

The set $A_1$ is composed of a certain number of fins; the ends "$a$" of these fins, adjacent to the passage $C_1$ may be opposite the ends "$b$" of the fins in the set $B_1$ adjacent to the same passage; if the ends "$a$" and "$b$" are aligned respectively along two separate generatrices, $G_1$ and $G'_1$, the generatrix $G_1$ being situated on the $A_1$ side and the generatrix $G'_1$ on the $B_1$ side, the passage formed between the sets $A_1$ and $B_1$ is rectilinear; this still applies when, with these alignments retained, the ends "$a$" of the fins $A_1$ are staggered in relation to the ends "$b$" of the set $B_1$; it is also possible to provide different spacing between fins in the different sets.

If the two generatrices $G_1$ and $G'_1$ coincide and the ends "$a$" and "$b$" are not opposite one another, a passage may still be considered to exist at the boundary of the sets $A_1$ and $B_1$, its median line being that of the alignment of the ends "$a$" and "$b$" of the fins; such a passage will be referred to as the 1st type of broken passage.

If the arrangement of the fins is such that the generatrix $G_1$ is on the set $B_1$ side and the generatrix $G'_1$ on the set $A_1$ side, there is still a "passage" between the sets $A_1$ and $B_1$; the interruptions in this passage are accentuated in comparison with the preceding type; such a passage will be referred to as the 2nd type of broken passage. In the structure having a broken passage it is also possible to provide different spacing between the different sets on the same casing.

In the modification of the structure in which the fins in each set are connected to the fins in adjacent sets in such a manner as to form complete herring-bones which are transverse in relation to the body of the casing and the profile of which is in the form of a broken line, there is no longitudinal passage on the body of the casing.

It is likewise possible to produce all the intermediate structures by interconnecting a plurality of sets of fins, the groups of said sets thus formed being separated by narrow passages which may be straight or broken.

For example, it is thus possible to obtain transverse herring-bones each of which is formed by four fins which are connected together and which belong to four consecutive sets, three of said herring-bones having longitudinal passages devoid of fins, being located successively at the same level around the casing.

Structures according to the second embodiment may likewise comprise rectilinear or broken passages, or no passages, between the series; these passages are then disposed substantially along the directrices of the body of the sheath; in the variant relating to a series made up of group, such passages likewise may or may not exist between the said consecutive groups.

In general, it is possible to provide variable spacing between the fins in one and the same set or between the fins in the different sets on the same casing; it is also possible to vary the inclination of the fins in relation to the generatrices of the surface of the casing; it is also possible to provide only one or different types of passage (straight passage, 1st type of broken passage, 2nd type of broken passage) on the same casing. The general direction of these passages, which is in the longitudinal direction of the casing, may be that of a generatrix or that of a helix having a greater pitch than the pitch of the helices determine by each fin.

The fins are generally all of the same height and normal to the body of the casing, the height being the dimension of the fin normal to the body of the casing; it is, however, possible to provide differences in height between the various fins on the casing; it is also possible to provide an inclination in the plane of the fins which are then no longer arranged normally to the body of the casing.

Let it be assumed that the fins in one set, which are all equidistant, are arranged along portions of $n$ helices; then if:

$e$ is the spacing of said fins,
$p$ is the pitch of the helices, and
$\alpha$ is the angle between the helix and a generatrix, the equation:

$$e = \frac{2\pi R \cos \alpha}{n} = p \frac{\sin \alpha}{n}$$

is obtained.

The most significant physical values which can be varied are $e$ and $\alpha$. Since the inclination $\alpha$ is given, it will be seen that $e$ can be varied in a discontinuous manner by modifying $n$. For a given spacing $e$ of the fins, various possible values may be had for $\alpha$ depending on the number of helices.

The structure according to the invention enables a turbulence to be obtained in the cooling fluid, which has the effect of producing a high coefficient of heat exchange between the casing and the cooling fluid.

Let a direction of circulation of the cooling fluid in relation to a certain position of the fuel element be selected arbitrarily; for example, the fuel element is arranged vertically and the circulation takes place from the bottom upwards; a space is always left between the walls of the channel in which the cooling fluid is circulating and the cylindrical surface which would pass through the edges of the fins. Since the channel in which the cooling fluid is circulating is generally cylindrical, this space will be called the "outer annular space"; if this space is nil or very small, there is no possibility of movement between the fluid circulating between the fins and the fluid in the outer annular space; if this space is adequate, turbulence will be produced, since the fluid circulating between the fins can be replenished as a result of exchanges with the fluid in the outer annular space; actually, the upward movement of the fluid causes, between the fins, currents of fluid having an upward movement either towards the left or towards the right according to the direction of the helices in each set; it follows that the small streams of fluid in the opposite portions of helices in two adjacent sets will collide and create turbulence.

This turbulence is produced both in the structure having fins in complete herring-bones and in the structure having longitudinal passages.

According to the first embodiment and in the case of the fins forming complete herring-bones, it may be assumed that at the junction point of rising streams of fluid in opposite directions, the fluid is ejected substantially normally to the body of the casing towards the outer annular space; the small streams of fluid are fed at the base of the helical channels determined by the fins forming the herring-bones, from the fluid in the outer annular space.

In the case of the structure having longitudinal passages, it may be assumed that these passages are functionally of two types: the first, which are discharge passages, are those into which converge the oppositely directed streams of fluid, the second, which are supply passages, are those which are fed only by the outer annular main stream.

At the junction point of the oppositely directed streams of fluid, some of the fluid from these streams continues its upward movemnt using the discharge passage passing through the junction point; nevertheless, the greater part of the fluid from these streams, which cannot take this path because this passage cannot accommodate all the fluid emerging from the various helical channels, mixes with the fluid rising from the outer annular space; the intake of the fluid into the helical channels is effected at their base, directly from the fluid in the outer annular space and/or by means of the fluid circulating in the supply passages.

In both cases, the upward movement of the fluid is modified in detail by multiple local movements of a transverse nature which take place all along the body of the casing, thus providing an excellent intense stirring throughout the whole mass of cooling fluid.

It may be noted that the structure forming the subject of the invention avoids the effect of rotation which is inherent in the cooling fins arranged helically in a single direction.

According to the second embodiment, one of the factors of the turbulence resides in changes in direction of the fluid filaments at the apices of the angles of the herring-bone elements defined by oppositely disposed fins in two adjacent transverse series; likewise according to this form, another turbulence factor resides in the leading-edge effect produced by the ends of the fins disposed opposite to the transverse passages between the various series of fins, and in appropriate cases by the ends of the fins disposed opposite to any longitudinal passages between the various groups of fins within a given series.

Various non-limiting examples of the casing structure having a cylindrical body and herring-bone fins, forming the subject of the invention, will be described below with reference to the accompanying diagrammatic FIGURES 1 to 15.

FIGURES 12 to 15 illustrate the outline of fins of varied structures according to the present invention, after part of the cylindrical surface of the sheath has been developed in a plane.

Only the elements necessary for comprehension of the invention are illustrated in these figures, the corresponding elements of various figures bearing identical reference numerals.

Figure 1:
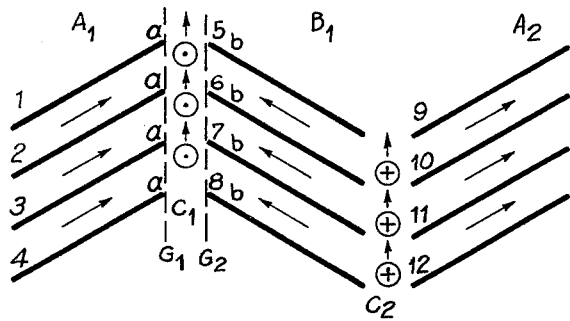

FIGURE 1 relates to a structure comprising longitudinal passages; the circulation of the fluid in the channel which contains the fuel element takes place from the bottom upwards in this figure; the direction of flow of the fluid in the helical channels determined by the fins 1, 2, 3, 4 in the set $A_1$, 5, 6, 7, 8 in the set $B_1$ and 9, 10, 11, 12 in the set $A_2$ is that indicated by the arrows; the small streams of fluid circulating in these channels meet in the discharge passage $C_1$; the crosses surrounded by a circle represent the intake of fluid from the outer annular space into the supply passage $C_2$ and into the helical channels, and the dots surrounded by a circle represent the movements of the fluid towards the outer annular space.

Figure 2:
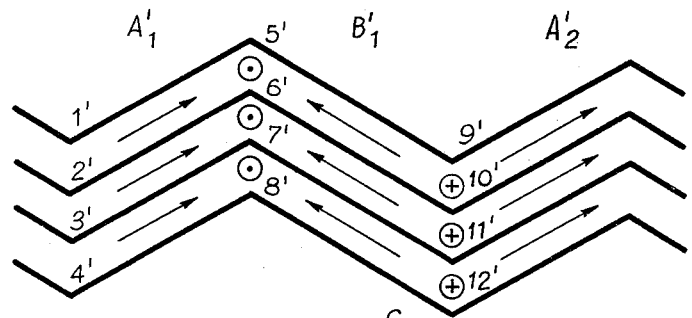
FIGURES 1 and 2 are basic diagrams explaining the manner in which the turbulence is created in the structures according to the first form of embodiment of the invention.

FIGURE 2 relates to the case of a structure having fins in complete herring-bones with fins 1', 2', 3', 4' in set $A'_1$; fins 5', 6', 7', 8', in set $B'_1$; and fins 9', 10', 11', 12' in set $A'_2$; only three of the elements of a herring-bone are illustrated; the replenishment of the fluid along the element is effected by means of transverse movements only.

Figure 3:
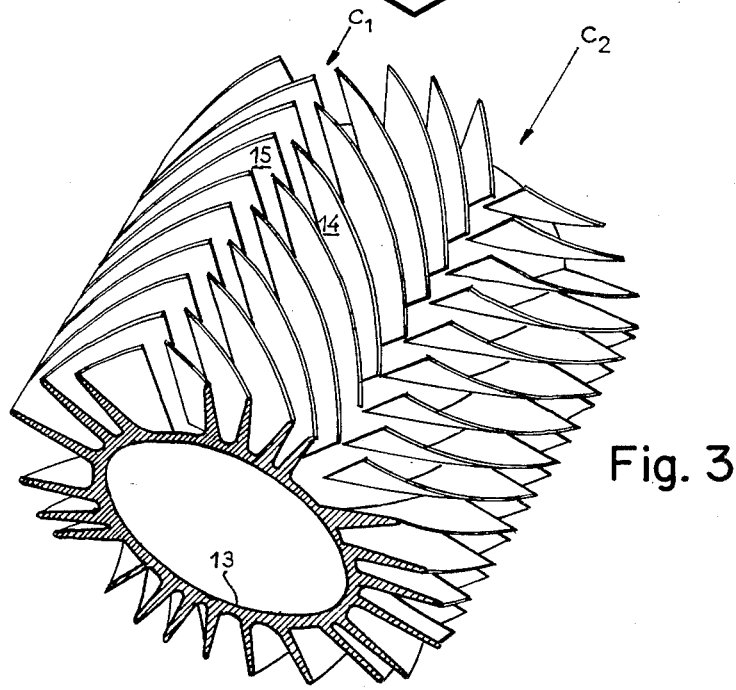
FIGURE 3 is a perspective view of a structure having a straight longitudinal passage according to the first form of embodiment of the invention.

FIGURE 3 shows the passages such as $C_1$ and $C_2$, the general direction of which is that of the generatrices of the casing, which is represented by 13. This casing is shown in section; the fins form sets of portions of helices; thus one such set is bounded by the passages $C_1$ and $C_2$. The fins such as 14 in this set are all in the same direction; the fins in an adjacent set are in the opposite direction; as, for example, fin 15 which faces the fin 14; the respective spacing of fins in adjacent sets is the same over the whole structure and determines the width of the longitudinal passages; the plane of all the fins is normal to the surface of the casing 13 and the spacing between two consecutive parallel fins is the same over the whole structure, as is the positive or negative angle which each of the fins forms with the generatrices.

Figure 4:
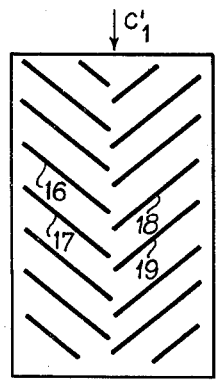
FIGURES 4 and 5 show, after development of a portion of the cylindrical surface of the casing in one plane, the pattern of the fins of structures having a broken longitudinal passage of the first embodiment of the invention.

FIGURE 4 shows passages such as $C_1$ which are longitudinal and broken; such passages are formed by limited overlapping of the fins, such as 16, 17 and 18, 19 respectively, in two adjacent sets; the spacing of two consecutive parallel fins such as 16 and 17 is the same throughout.

Figure 5:
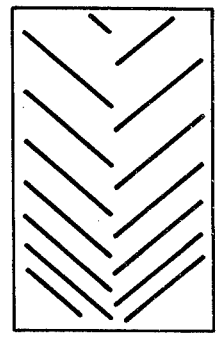

In FIGURE 5, the spacing of the fins in the same set increases progressively, the direction in which this increase takes place being the same in the various sets; the spacing is always the same at one and the same transverse level; the passages on this structure are of the same type as on the preceding structure; since the turbulence is greater in the zones where the spacing is less, this structure may be used when the thermal flux is unequally distributed along the casing.

Figure 6:
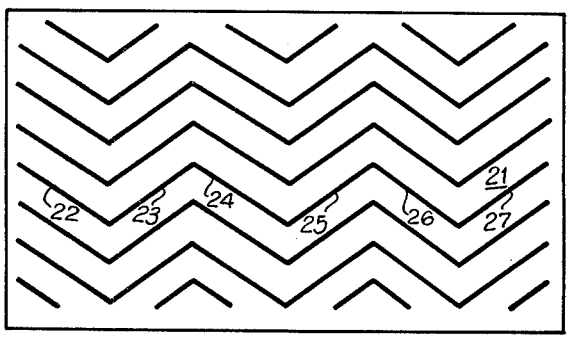
FIGURE 6 shows, after development of the cylindrical surface of the casing in one plane, the pattern of the fins of a structure comprising complete herring-bones of the first embodiment of the invention.

In FIG. 6 it will be seen that the fins at the same level are connected together in such a manner as to form transverse herring-bones which surround the body of the casing; thus the herring-bone 21 is formed by the fins 22, 23, 24, 25, 26 and 27, the fins 22, 24, 26 forming, on the cylindrical surface, portions or helices in the opposite direction to those formed by the fins 23, 25 and 27; such a structure does not have longitudinal passages.

A modification consists in introducing longitudinal passages in such a manner as to divide the herring-bones into a plurality of parts, each part consisting of at least two fins in opposite directions.

Figure 7:
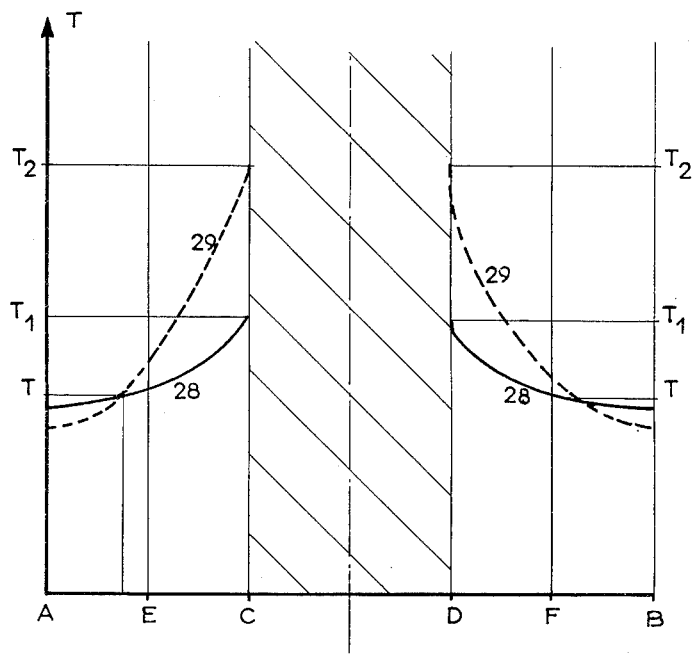
FIGURE 7 is a graph representing the distribution of temperatures in the cooling fluid when a structure of the first embodiment of the invention is used.

The curve 28 in full line in FIGURE 7 represents the variations in the temperature T in the cooling fluid through the section AB of the channel in which said fluid is circulating; the fuel element to be cooled is the section CD without fins and to the section EF with fins. The outer annular space is the space comprised between the sections AB and EF; the broken curve 29 shows, for the same mean temperature T of the cooling fluid, the distribution of temperatures in the channel AB when a structure is used which differs from the structure according to the invention in that it is devoid of fins; it will be noted how flattened the curve 28 is in comparison with the curve 29; the difference between the temperature of the casing and the mean temperature T of the cooling fluid is represented by $(T_1-T)$ for the curve 28 and by $(T_2-T)$ for the curve 29; it will be seen that it is sharply reduced by the use of the structure according to the invention.

On all the developed profiles in FIGURES 9, 11, 12, 13 and 14, the line $a, b, c, d, e$ along which the lateral surface of the sheath has been cut represents a generatrix of the latter.

Figure 8:
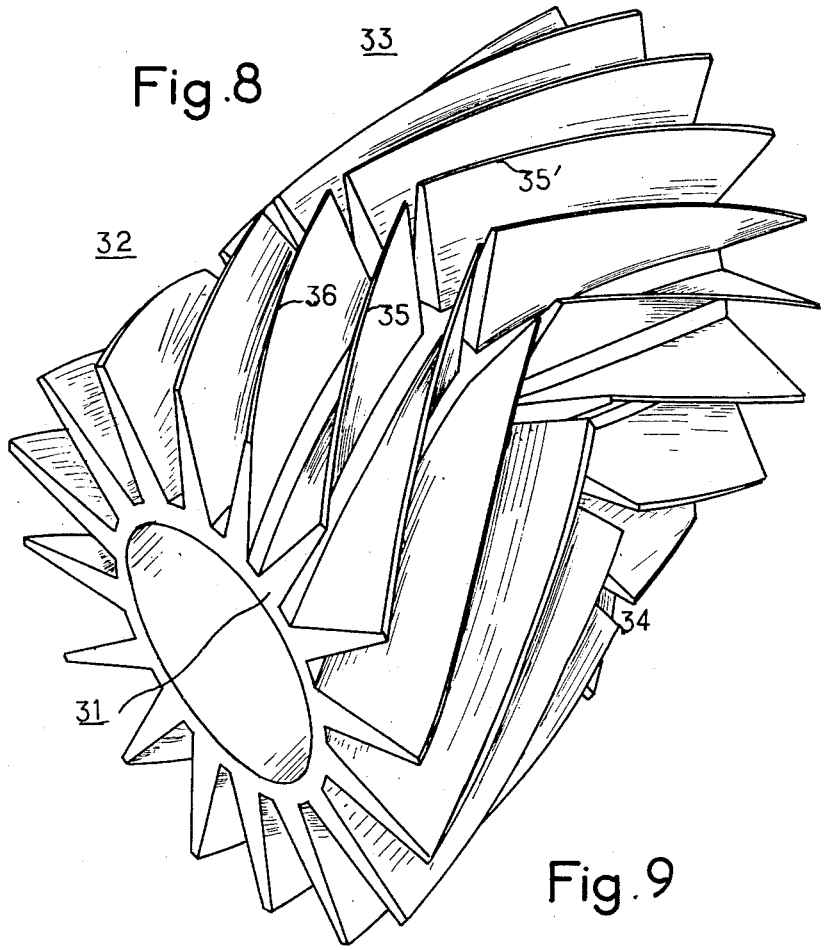
FIGURE 8 illustrates a perspective view of a first structure according to the invention wherein the bisecting planes of the re-entrant angles of the herring-bone elements are all transverse.
Figure 9:
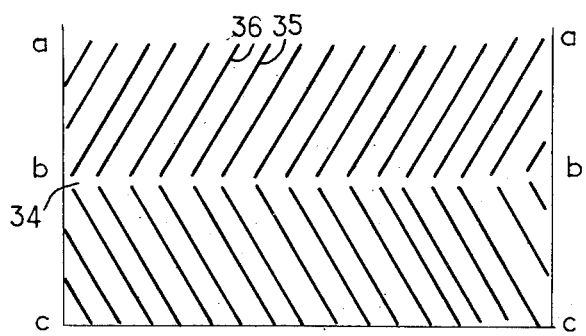
FIGURE 9 illustrates the outline of the fins in the structure in FIGURE 8, on a smaller scale and after part of the cylindrical surface of the sheath has been developed onto a plane.

FIGURES 8 and 9 show the body 31 of the sheath equipped with series of fins such as 32 and 33; the separating lines between the series, such as the line 34 between the series 32 and 33 are transverse; the fins, such as 35 and 36, in each series are all parallel to one another, and are substantially in the shape of portions of a helix; the portions of helices in the various series are alternately to the right and to the left. The fins in adjacent series, taken in pairs, form herring-bone elements such as 35—35'; the bisecting plane of the re-entrant angle formed by this herring-bone element is transverse, and is disposed substantially along the separating line 34; the constituent parts of the herring-bone elements are not contiguous, and define transverse passages along all the lines 34. The structure in FIGURES 10 and 11 comprises various series of fins, such as 32 and 33; the separating lines 34 between these series are likewise transverse; each series of fins comprises four groups 37, 38, 39 and 40, each made up of six fins, such as the fins 41, 42, 43, 44, 45, 46 for the group 37, all parallel to one another; the fins in any group are symmetrical to the fins in an adjacent group with respect to the separating line 47 between the two groups. Each fin defines a herring-bone element with the adjacent fin in an adjacent group, such as the fin 41 in the group 37 with the fin 41'' in the group 40, and another with the adjacent fin in a group in the adjacent series, such as the same fin 41'' with the fin 41' in the series 33; the constituent parts of the herring-bone elements are not contiguous, and thus define transverse passages along the lines 34 separating the series, and longitudinal passages along the separating lines 47 between the various groups in the series.

Figure 10:
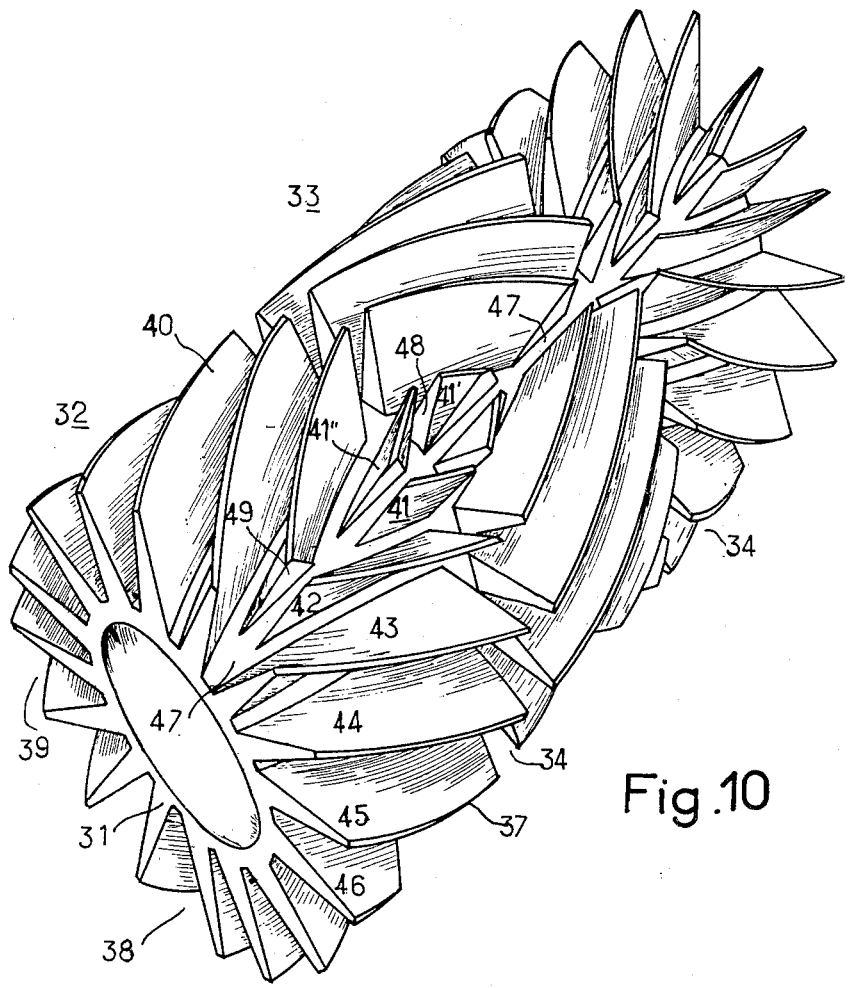
FIGURE 10 illustrates a perspective view of a second structure according to the invention, wherein the bisecting planes of the re-entrant angles of some herring-bone elements are longitudinal, while the bisecting planes of the re-entrant angles of the other herring-bone elements are transverse.
Figure 11:
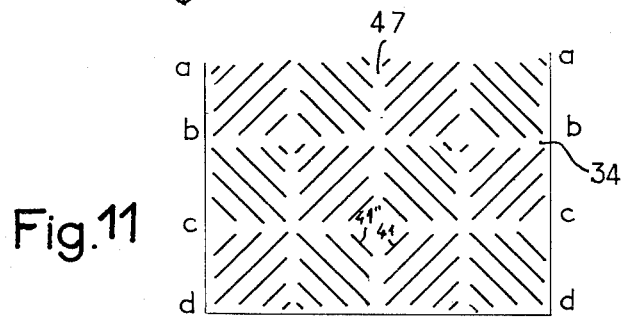
FIGURE 11 illustrates the outline of the fins in the structure in FIGURE 10, on a smaller scale and after part of the cylindrical surface of the sheath has been developed on to a plane.

Both in the case of the structure in FIGURES 8 and 9 and in the structure in FIGURES 10 and 11, the fluid filaments flowing through the basic ducts defined between the fins have turbulence in the zones disposed along the separating lines 34 and/or 47; as previously mentioned, a deflector effect and a leading-edge effect reinforce the turbulence obtained by the meeting of differently directed fluid currents; the faces of the fins, such as 38 and 39, disposed along the transverse or longitudinal passages, are responsible for this lead-edge effect.

FIGURE 12 illustrates a variant of the structure in FIGURES 10 and 11, wherein the oppositely directed angles of the various groups of fins are equal in absolute value, while, the directions of the helices defined by these same groups may be the same from one group in a series to the adjacent group in the following series.

FIGURE 13 relates to a structure, derived from the structure in FIGURES 8 and 9, wherein the spacing of the fins varies progressively transversely in each series.

FIGURE 14 is another variant relating to modifications in the spacing and slant of the fins.

The transverse and/or longitudinal passages illustrated in FIGURES 8 to 12 and 14 may be absent from all or some of the separating lines between the various series of fins and/or between the various groups of fins in a given series.

Figure 15:
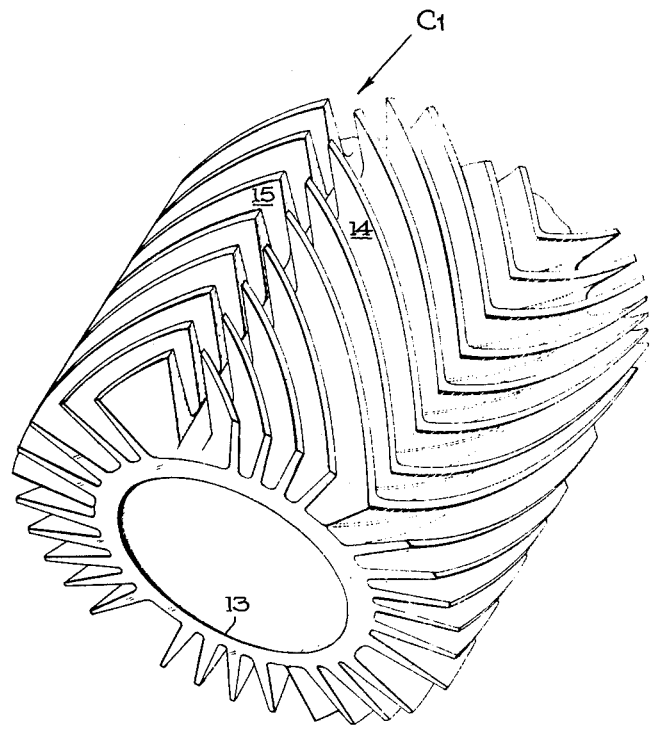

FIG. 15 shows an embodiment of the present concept similar to that shown in FIGS. 1 and 3, but in which alternate passages, such as passages $C_2$, have been omitted by connecting adjacent fins to form a partial herring-bone construction. The connected fins form portions of helices and are oppositely directed.

What is claimed is:

1. In a sheath structure for fuel elements of a nuclear reactor, a cylindrical body for the sheath structure, fins on said body, the entire surface of said fins being disposed in a plurality of series of portions of helices, each of said series being disposed longitudinally of said body, said portions of said helices being parallel to each other in each of said series and of opposite direction from one of said series to the other of said series and passages between said series of fins.

2. Structure as described in claim 1 in which the fins of one of said series are connected to the fins of the next of said series and a plurality of straight passageways without fins on said body, consecutive passageways defining transverse herring-bones formed by at least two fins of opposite direction.

3. Structure as described in claim 1 in which said passageways are parallel to a generatrix of said cylindrical body, the ends of said fins of adjacent ones of said series of fins being disposed opposite each other on opposite sides of one of said passages.

4. In a sheath structure for cylindrical body fuel elements of a nuclear reactor in which the flow of cooling fluid is parallel to the axis of the fuel element, a sheath for the fuel element, fins on and around said sheath formed in a plurality of series of portions of helices disposed transversely to the longitudinal axis of the sheath, the entire surfaces of said fins being helicoidal elements having the same longitudinal axis as said sheath and raised above said sheath along said portions, each of said series having an opposite direction to next adjacent series.

5. Structure as described in claim 4 in which said portions of helices of any one of said series are parallel to each other.

6. Structure as described in claim 4, the portions of helices of any one of said series being divided in two alternate groups, each of said groups being composed of portions of helices parallel to each other and having a direction opposite to that of the portions of helices of the adjacent group.

References Cited by the Examiner

UNITED STATES PATENTS

| | | |
|---|---|---|
| 2,418,619 | 4/47 | Brown. |
| 2,861,034 | 11/58 | Wigner et al. _____ 204—193.2 |
| 2,967,139 | 1/61 | Bartoszak _____ 204—193.2—34 |
| 2,998,228 | 8/61 | Huet. |

FOREIGN PATENTS

| | | |
|---|---|---|
| 558,588 | 7/57 | Belgium. |
| 560,535 | 9/57 | Belgium. |
| 795,938 | 3/36 | France. |
| 1,241,855 | 8/60 | France. |
| 1,066,291 | 10/59 | Germany. |
| 364,861 | 1/32 | Great Britain. |
| 849,484 | 9/60 | Great Britain. |
| 856,740 | 12/60 | Great Britain. |

OTHER REFERENCES

Heating and Ventilating, September 1946, page 41.

REUBEN EPSTEIN, *Primary Examiner.*

CARL D. QUARFORTH, OSCAR R. VERTIZ,
*Examiners.*